United States Patent
Ose

(10) Patent No.: US 6,763,740 B1
(45) Date of Patent: Jul. 20, 2004

(54) BICYCLE DEVICE WITH A BREAK-AWAY ATTACHMENT FOR A CONNECTING CABLE

(75) Inventor: Kenji Ose, Sakai (JP)

(73) Assignee: Shimano, Inc., Sakai (JP)

( * ) Notice: Subject to any disclaimer, the term of this patent is extended or adjusted under 35 U.S.C. 154(b) by 418 days.

(21) Appl. No.: 09/280,180

(22) Filed: Mar. 29, 1999

Related U.S. Application Data

(63) Continuation-in-part of application No. 09/238,529, filed on Jan. 27, 1999.

(51) Int. Cl.[7] .................................................. F16C 1/14
(52) U.S. Cl. ......................... 74/500.5; 74/502.6; 24/3.4
(58) Field of Search ............................. 74/500.5, 502.4, 74/502.5, 502.6, 501.5 R, DIG. 7, 473.3; 24/3.4, 115 F, 115 H, 116 A, 265 AL, 597

(56) References Cited

U.S. PATENT DOCUMENTS

| | | | | |
|---|---|---|---|---|
| 2,149,550 A | * | 3/1939 | Richards et al. ............... | 24/597 |
| 2,592,696 A | * | 4/1952 | Hoody ....................... | 24/115 F |
| 2,816,341 A | * | 12/1957 | Prest ............................ | 24/597 |
| 3,253,480 A | * | 5/1966 | Fernberg ................... | 74/502.2 |
| 3,458,993 A | * | 8/1969 | Greene ...................... | 24/116 A |
| 3,537,328 A | * | 11/1970 | Allen ......................... | 74/473.3 |
| 4,441,836 A | * | 4/1984 | Boda .......................... | 403/154 |
| 4,480,494 A | * | 11/1984 | Gilmore ..................... | 74/502.5 |
| 4,503,958 A | * | 3/1985 | Nishio ........................ | 74/473.3 |
| 4,821,593 A | * | 4/1989 | Kobylarz ................... | 74/500.5 |
| 4,823,752 A | * | 4/1989 | Uuskallio ................... | 74/502.6 |
| 4,838,197 A | * | 6/1989 | Watson ....................... | 74/500.5 |
| 4,846,322 A | * | 7/1989 | Swank ....................... | 74/473.3 |
| 4,876,948 A | * | 10/1989 | Yasukawa et al. ......... | 74/502.6 |
| 5,078,242 A | * | 1/1992 | Ratke et al. ............... | 74/502.6 |
| 5,142,935 A | * | 9/1992 | Carr .......................... | 74/502.6 |
| 5,178,033 A | * | 1/1993 | Kund ..................... | 74/DIG. 7 |
| 5,207,116 A | * | 5/1993 | Sultze ........................ | 74/502.4 |
| 5,230,257 A | * | 7/1993 | Nowak ....................... | 74/502.4 |
| 5,454,140 A | * | 10/1995 | Murai ....................... | 24/115 H |
| 5,458,018 A | | 10/1995 | Kawakami ................. | 74/502.2 |
| 5,518,056 A | * | 5/1996 | Voss .......................... | 24/115 F |
| 5,542,461 A | * | 8/1996 | Huang ........................ | 24/602 |
| 5,606,782 A | * | 3/1997 | Patterson et al. .......... | 24/598.5 |
| 5,816,109 A | * | 10/1998 | Dege ......................... | 74/502.4 |
| 5,987,709 A | * | 11/1999 | Chou ........................ | 24/115 F |
| 6,022,239 A | * | 2/2000 | Wright ....................... | 439/354 |
| 6,038,942 A | * | 3/2000 | Gabas et al. ............... | 74/500.5 |

FOREIGN PATENT DOCUMENTS

| | | |
|---|---|---|
| JP | 60-23273 | 7/1985 |
| JP | 61-5348 | 2/1986 |

* cited by examiner

*Primary Examiner*—Chong H. Kim
(74) *Attorney, Agent, or Firm*—James A. Deland

(57) ABSTRACT

An apparatus for coupling to a control cable having a cable end protuberance attached thereto includes a member having a cable terminating structure. The cable terminating structure includes a first wall defining a first detenting structure for receiving the cable end protuberance and a second wall spaced apart from the first wall. At least one of the first wall and the second wall includes a resilient portion for deflecting in response to a pulling force applied to the cable terminating structure by the cable end protuberance so as to release the cable end protuberance from the cable terminating structure.

26 Claims, 9 Drawing Sheets

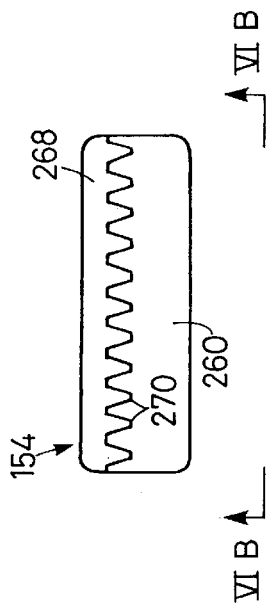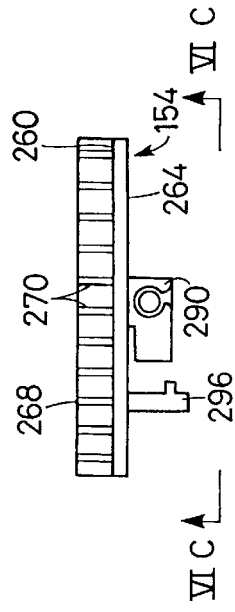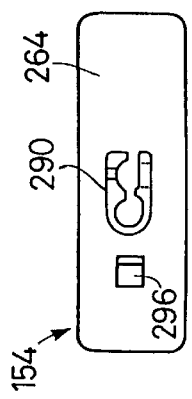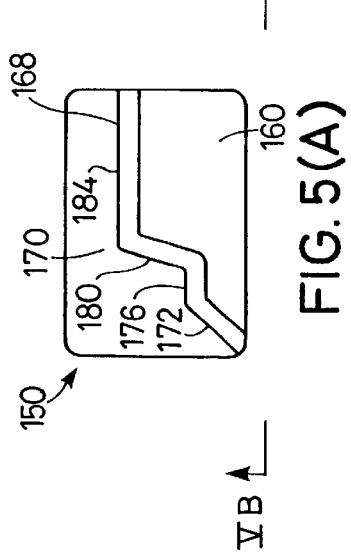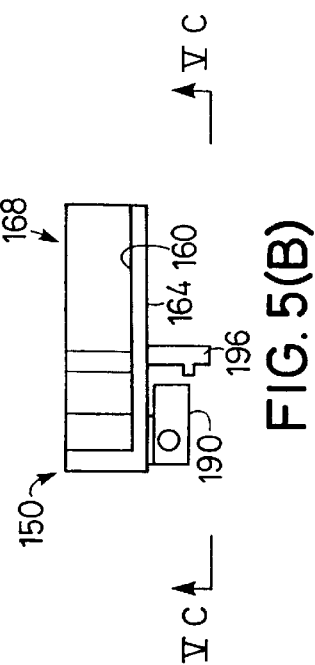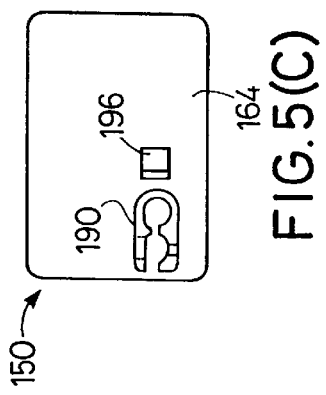

BICYCLE DEVICE WITH A BREAK-AWAY ATTACHMENT FOR A CONNECTING CABLE

CROSS REFERENCE TO RELATED APPLICATIONS

This application is a continuation-in-part of copending application Ser. No. 09/238,529 filed Jan. 27, 1999.

BACKGROUND OF THE INVENTION

The present invention is directed to bicycle control devices and, more particularly, to n bicycle device which includes a break-away attachment for a connecting cable.

Many bicycle components operate by pulling a cable connected to some other element. For example, many bicycle shift control devices have indicators associated with them to indicate the currently selected gear of the bicycle transmission. Copending U.S. patent application Ser. No. 09/238,529 discloses an indicator unit for a bicycle shift control device wherein the currently selected speed stage for both front and rear bicycle transmissions may be ascertained from a centralized location and without having to directly read numbers. More specifically, an indicator unit is provided for engaging a first control cable connected to a first bicycle shift control device and for engaging a second control cable connected to a second bicycle shift control device. The indicator unit includes a housing; a handlebar attachment member for attaching the housing to a handlebar; a first intermediate member; a first coupling member coupled to the first intermediate member for coupling the first intermediate member for movement with the first control cable; and a separate first indicating member viewable from outside the housing, wherein the first indicating member engages the first intermediate member so that movement of the first intermediate member causes movement of the first indicating member. The indicator unit also includes a second intermediate member; a second coupling member coupled to the second intermediate member for coupling the second intermediate member for movement with the second control cable; and a separate second indicating member viewable from outside the housing, wherein the second indicating member engages the second intermediate member so that movement of the second intermediate member along the guide surface causes movement of the second indicating member.

Each first and second intermediate member includes a cable terminating structure with a cable slot formed therein for retaining a cable end protuberance attached to the end of its associated control cable. Thus, pulling the control cable causes a pulling force on the cable terminating structure which, in turn, moves the intermediate member. To reduce the overall size of the indicator unit, it is desirable to make the components as small as possible. This is especially true for the first and second intermediate members. However, a decrease in the size of the intermediate member involves a corresponding decrease in size of the cable terminating structure. This, in turn, causes a decrease in strength of the cable terminating structure. Thus, if a strong pulling force is applied to the control cable, there is a risk that the cable terminating structure will become damaged. Thus, it is desirable to make a cable terminating structure which can accommodate strong control cable pulling forces. This is true not only for a bicycle indicating unit described above, but also for other bicycle devices such as shift levers, suspension adjusting levers, and so on.

SUMMARY OF THE INVENTION

The present invention is directed to a bicycle device wherein a member used to receive a pulling force of a control cable has a cable terminating structure that accommodates strong pulling forces applied by the control cable. In one embodiment of the present invention, an apparatus for coupling to a control cable having a cable end protuberance attached thereto includes a member having a cable terminating structure. The cable terminating structure includes a first wall defining a first detenting structure for receiving the cable end protuberance and a second wall spaced apart from the first wall. At least one of the first wall and the second wall includes a resilient portion for deflecting in response to a pulling force applied to the cable terminating structure by the cable end protuberance so as to release the cable end protuberance from the cable terminating structure.

In a more specific embodiment, the first wall includes a first detenting recess in the form of a first detenting opening extending entirely through the first wall for forming the first detenting structure. Additionally, the first wall includes a slot extending from the first detenting opening through a side edge of the first wall. This facilitates assembly of the control cable to the cable terminating structure because, if the first detenting opening is made large enough, the cable end protuberance and control cable can be passed through the first detenting opening and slot, respectively, until the control cable is sandwiched between the first and second walls. To further increase the detenting effect, the second wall may include a second detenting recess for forming the second detenting structure. If the cable end protuberance has a spherical shape, then the cable end protuberance may be disconnected easily from the cable terminating structure in the event of excessive pulling forces applied to the control cable.

BRIEF DESCRIPTION OF THE DRAWINGS

FIG. 5(A) is a top view of a camming member shown in FIG. 3;

FIG. 5(B) is a view taken along line VB—VB in FIG. 5(A);

FIG. 5(C) is a view taken along line VC—VC in FIG. 5(B);

FIG. 6(A) is a top view of a gearing member shown in FIG. 3;

FIG. 6(B) is a view taken along line VIB—VIB in FIG. 6(A);

FIG. 6(C) is a view taken along line VIC—VIC in FIG. 6(B);

DETAILED DESCRIPTION OF THE EMBODIMENTS

Figure 1:
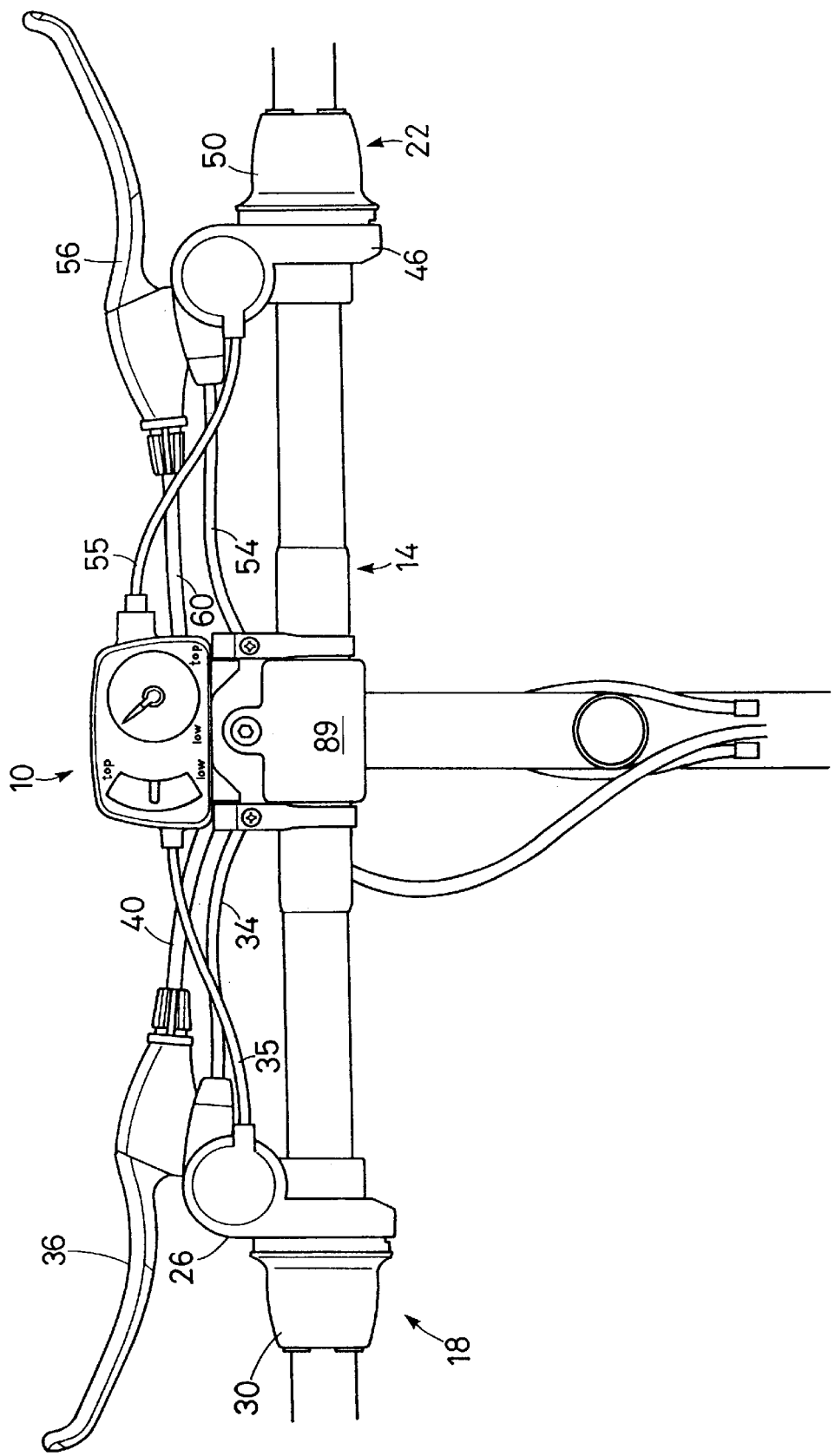
FIG. 1 is a top view of a particular embodiment of an indicator unit according to the present invention, wherein the indicator unit is attached to a bicycle handlebar and to front and rear shift control devices.

FIG. 1 is a top view of a particular embodiment of an indicator unit 10 according to the present invention, wherein indicator unit 10 is attached to a bicycle handlebar 14, to a front shift control device 18 and to a rear shift control device 22. Front shift control device 18 and rear shift control device 22 may be constructed according to the teachings of allowed U.S. patent application Ser. No. 08/854,520, U.S. Pat. No. 3,633,437, both incorporated herein by reference, or any other type of shift control device that can be modified to accommodate cables used to control indicator unit 10 as described below.

In this embodiment, front shift control device 18 includes a shift control housing 26 and an annular rotatable member 30 rotatably mounted to shift control housing 26. Rotatable member 30 operates a pulley (not shown) through an indexing mechanism (not shown) contained within shift control housing 26 to control the operation of a Bowden-type derailleur cable 34 in a well known manner. The pulley used to control derailleur cable 34 may have an additional winding surface to accommodate a Bowden-type front indicator cable 35. A brake lever 36 is rotatably mounted to shift control housing 26 for controlling a front brake apparatus (not shown) through a Bowden-type brake cable 40. Similarly, rear shift control device 22 includes a shift control housing 46 and an annular rotatable member 50 rotatably mounted to shift control housing 46. Rotatable member 50 operates a pulley (not shown) through an indexing mechanism (not shown) contained within shift control housing 46 to control the operation of a Bowden-type derailleur cable 54 in a well known manner. The pulley used to control derailleur cable 54 may have an additional winding surface to accommodate a Bowden-type rear indicator cable 55. A brake lever 56 is rotatably mounted to shift control housing 46 for controlling a front brake apparatus (not shown) through a Bowden-type brake cable 60.

Figures 2A, 2B:
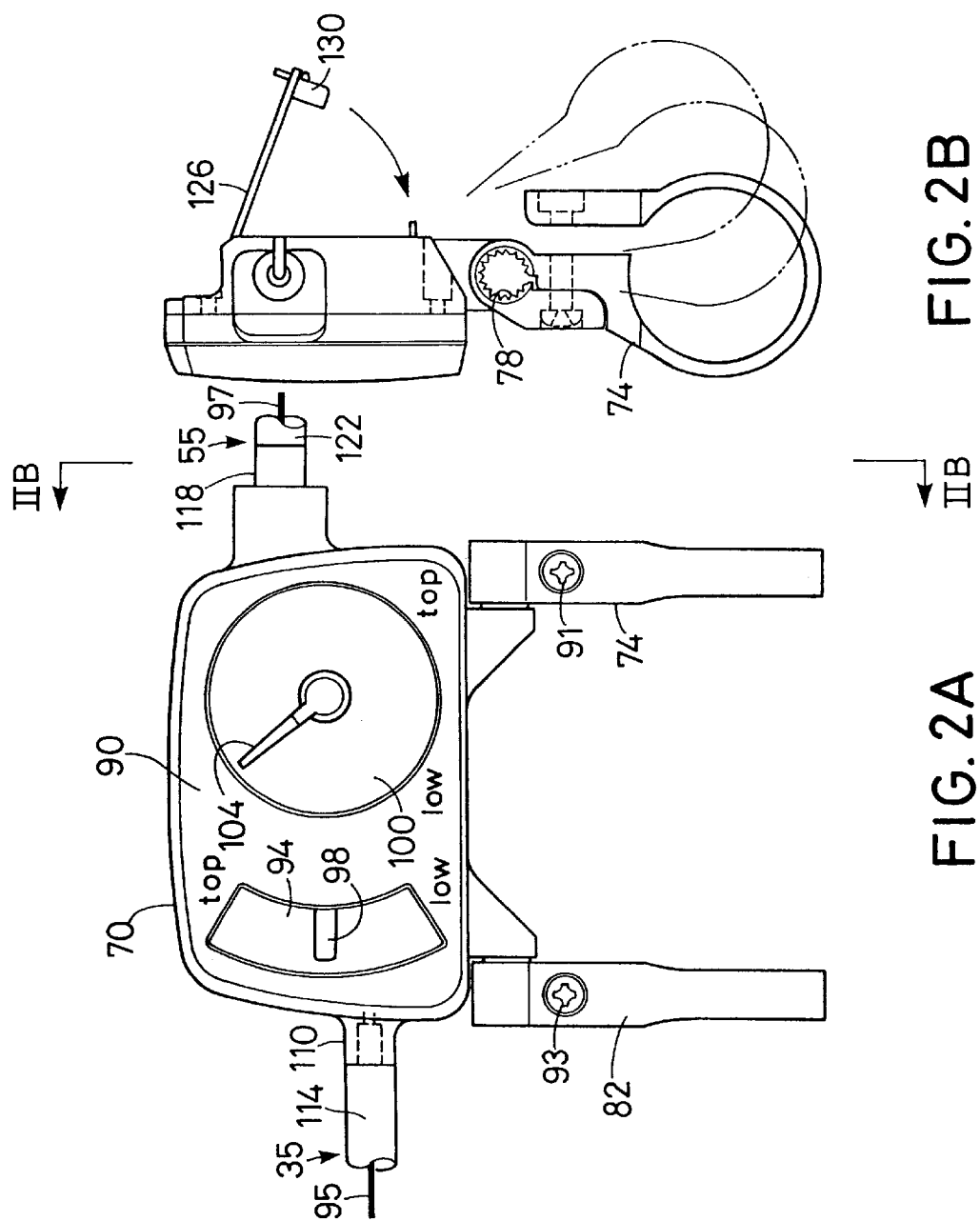
FIG. 2(A) is a top view of the indicator unit shown in FIG. 1.
FIG. 2(B) is a view taken along line IIB—IIB in FIG. 2(A)

As shown in FIGS. 1, 2(A) and 2(B), indicator unit 10 includes an indicator housing 70, a first handlebar attachment member 74 movably coupled to housing 70 through a first splined connection 78, and a second handlebar attachment member 82 movably coupled to indicator housing 70 through a second splined connection 86. First handlebar attachment member 74 normally is oriented generally parallel to second handlebar attachment member 82, and they are spaced apart from each other so that they may be attached to handlebar 14 on opposite sides of a centrally disposed handlebar stem 89. However, because of the first and second splined connections 78 and 86, the position of first and second handlebar attachment members 74 and 82 relative to indicator housing 70 may be adjusted as shown by the broken line in FIG. 2(B). This allows the viewing angle of indicator unit 10 to be varied as desired.

First and second handlebar attachment members 74 and 82 are formed as U-shaped members as shown in FIG. 2(B) (only first handlebar attachment member 74 is shown). First and second handlebar attachment members 74 and 82 are secured to handlebar 14 through nut and bolt assemblies 91 and 93, respectively, in a well known manner.

A top cover surface 90 of indicator housing 70 includes a transparent window 94 for viewing a front gear indicating member 98 therethrough and a transparent cover 100 for viewing a rear gear indicating member 104 therethrough. A front cable stop 110 is disposed on the left side of indicator housing 70 for terminating an outer casing 114 of front indicator cable 35, and a rear cable stop 118 is disposed on the right side of indicator housing 70 for terminating an outer casing 122 of rear indicator cable 55. A rear cover 126 (FIG. 2(B)) is pivotably coupled to the rear of indicator housing 70 so that the rear of indicator housing 70 may be accessed for attachment of the inner wires 95 and 97 of front and rear indicator cables 35 and 55, respectively to the components inside indicator housing 70. A latch 130 is disposed on the lower portion of rear cover 126 for securing the lower portion of rear cover 126 to indicator housing 70.

Figure 3:
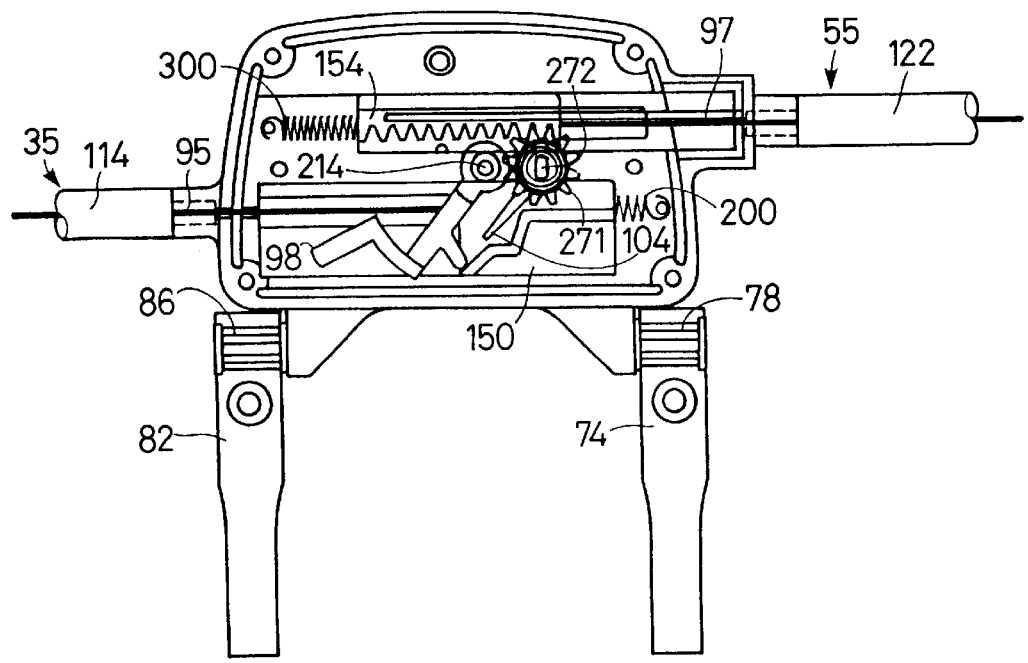
FIG. 3 is a top view of the interior of the indicator unit.
Figure 4:
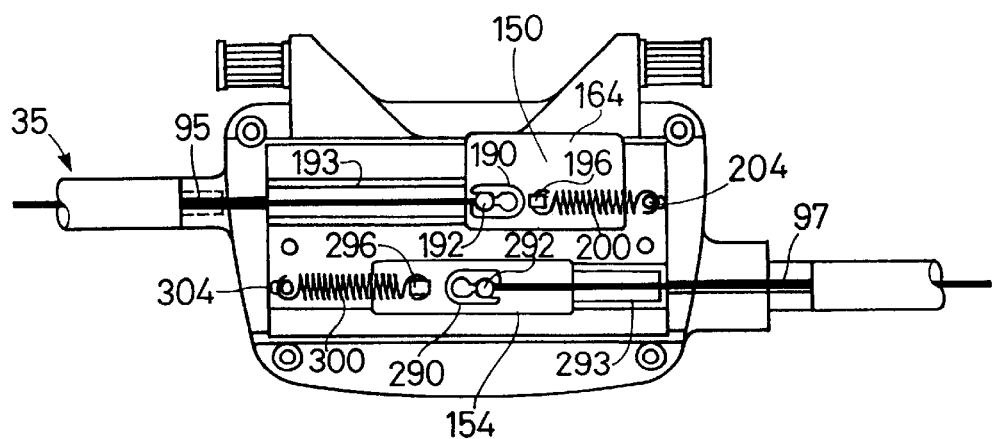
FIG. 4 is a bottom view of the interior of the indicator unit.

FIG. 3 is a top view of the interior of indicator unit 10, and FIG. 4 is a bottom view of the interior of indicator unit 10 (without first and second handlebar attachment members 74 and 82). As shown in those Figures, inner wire 95 of front indicator cable 35 is coupled to an intermediate member in the form of a camming member 150, and inner wire 97 of rear indicator cable 55 is coupled to an intermediate member in the form of a gearing member 154.

As shown in FIGS. 5(A–C), camming member 150 is a generally rectangular shaped member with a generally flat top surface 160 and a generally flat bottom surface 164. A camming wall 168 is disposed on top surface 160. Camming wall 168 forms a camming surface 170 including a first inclined surface 172, a first horizontal surface 176, a second inclined surface 180, and a second horizontal surface 184. As discussed below with reference to FIGS. 7 and 8, camming surface 170 cooperates with front indicating member 98 to move front indicating member 98 to various locations relative to indicator housing 70.

Camming member 150 includes a cable terminating structure in the form of a cable terminating projection 190 extending from bottom surface 164 for retaining a cable end protuberance 192 formed on the end of inner wire 95. Thus, cable terminating projection 190 functions as a coupling member for coupling inner wire 95 to camming member 150. Cable terminating projection 190 slides within a straight recessed guide surface or track 193 formed in indicator housing 70 so that camming member 150 moves in a straight line in response to movement of inner wire 95. Camming member 150 also includes a spring retaining post 196 extending from bottom surface 164 for retaining one end of a coil spring 200. The other end of coil spring 200 is attached to a spring retaining post 204 extending from the surface of indicator housing 70. Thus, coil spring 200 functions as a biasing mechanism for biasing camming member 150 to the right in FIGS. 3 and 4.

Figure 7:
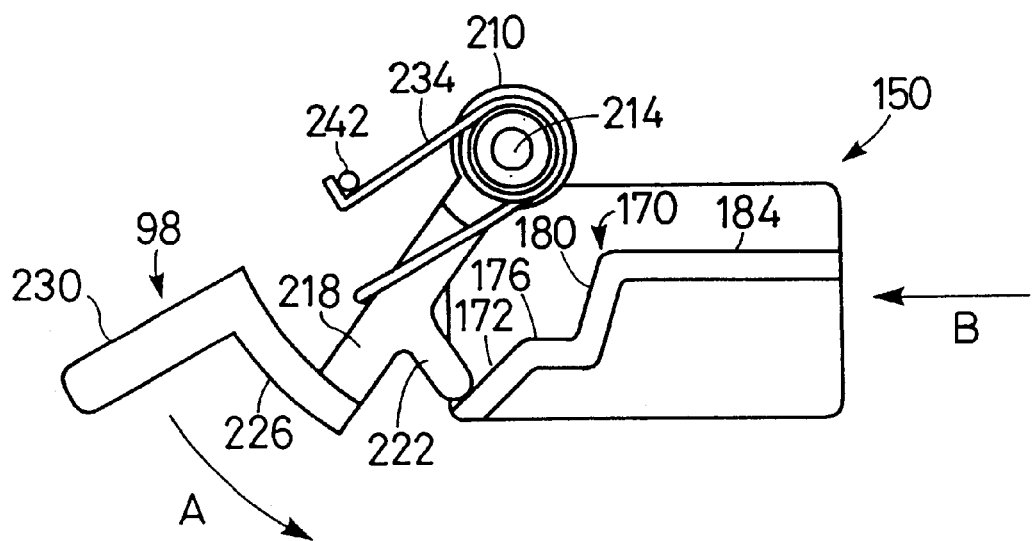
FIG. 7 is a detailed view of the camming member and camming indicating member shown in FIG. 3.
Figure 8:
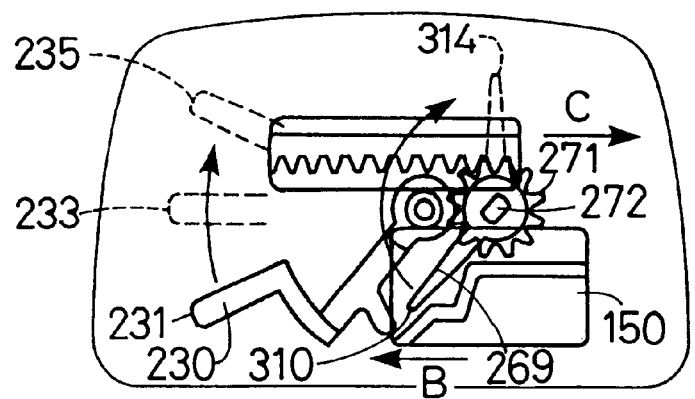
FIG. 8 is a schematic view showing the operation of the indicator unit shown in FIG. 3.

As shown in FIGS. 3 and 7, the separate front indicating member 98 includes a support portion 210 rotatably mounted around a pivot shaft 214 extending from indicator housing 70, a generally straight main body portion 218 extending from support portion 210, a cam follower portion 222 projecting at an incline from main body portion 218, a viewing needle support portion 226 arcuately extending approximately perpendicular from the end of main body portion 218, and a generally straight front viewing needle 230 extending from viewing needle support portion 226. A spring 234 has one end abutting a spring retaining post 242 extending from indicator case 70 and another end abutting against main body portion 218. Thus, spring 234 functions as a biasing mechanism for biasing cam follower portion 222 in the direction of arrow A towards camming surface 170 on camming member 150. Front viewing needle 230 is in a low speed viewable position 231 relative to indicator housing 70 in this position as shown in FIG. 8.

In operation, rotating rotatable member 30 of front shift control device 18 causes the pulley inside housing 26 to pull inner wire 95. This causes camming member 150 to move to the left as shown by arrow B in FIGS. 7 and 8. As camming member 150 moves to the left, cam follower portion 222 slides along first inclined surface 172 and front gear indicating member 98 rotates around the axis defined by pivot shaft 214 until cam follower portion 222 rests on first horizontal surface 176. Front viewing needle 230 is in an intermediate speed viewable position 233 relative to indicator housing 70 in this position. Further rotating of rotatable member 30 and pulling of inner wire 95 causes cam follower portion 222 to slide along second inclined surface 180 until cam follower portion 222 rests on second horizontal surface 184. Front viewing needle 230 is in a top or high speed viewable position 235 relative to indicator housing 70 in this position. Rotating rotatable member 30 in the opposite direction likewise causes camming member 150 and front gear indicating member 98 to move in the opposite direction with the aid of biasing springs 200 and 234. Since front indicating member 98 moves to different viewable positions relative to indicator housing 70, the rider can sense the currently selected speed stage without having to read numbers.

As shown in FIGS. 6(A–C), gearing member 154 is a generally rectangular shaped member with a generally flat top surface 260 and a generally flat bottom surface 264. A gearing wall 268 having a plurality of gearing teeth 270 disposed in a generally straight line extends from top surface 260 as an integral portion of top surface 260. As shown in FIGS. 3 and 8, the separate rear gear indicating member 104 has the form of a rear gear viewing needle 269 having a gear portion 271 that is rotatably mounted to indicator housing 70 through a pivot shaft 272. Gear portion 271 meshes with gearing teeth 270 so that rear gear indicating member 104 rotates around the axis defined by pivot shaft 272 in response to movement of gearing member 154. This, in turn, causes rear gear viewing needle 269 to move to different viewable positions along indicator housing 70.

Gearing member 154 includes a cable terminating structure in the form of a cable terminating projection 290 extending from bottom surface 264 for retaining a cable end protuberance 292 formed on the end of inner wire 97. Thus, cable terminating projection 290 functions as a coupling member for coupling inner wire 97 to gearing member 154. Cable terminating projection 290 slides within a straight recessed guide surface or track 293 formed in indicator housing 70 so that gearing member 154 moves in a straight line in response to movement of inner wire 97. Gearing member 154 also includes a spring retaining post 296 extending from bottom surface 264 for retaining one end of a coil spring 300. The other end of coil spring 300 is attached to a spring retaining post 304 extending from the surface of indicator housing 70. Thus, coil spring 300 functions as a biasing mechanism for biasing gearing member 154 to the left in FIGS. 3 and 4.

In operation, rotating rotatable member 50 of rear shift control device 22 causes the pulley inside housing 46 to pull inner wire 97. This causes gearing member 154 to move to the right as shown by arrow C in FIG. 8. As a result, rear gear viewing needle 269 moves from a lower speed position 310 toward a higher speed position 314 relative to indicator housing 70 as shown by arrow D. Rotating rotatable member 50 in the opposite direction causes gearing member 154 and rear gear indicating needle 269 to move in the opposite direction with the aid of biasing spring 300. The number of discrete positions assumed by rear gear viewing needle 269 depends on the number of speeds accommodated by rear shift control device 22. As with front gear indicating member 98, since rear gear indicating member 104 moves to different viewable positions relative to indicator housing 70, the rider can sense the currently selected speed stage without having to read numbers.

Figure 9:
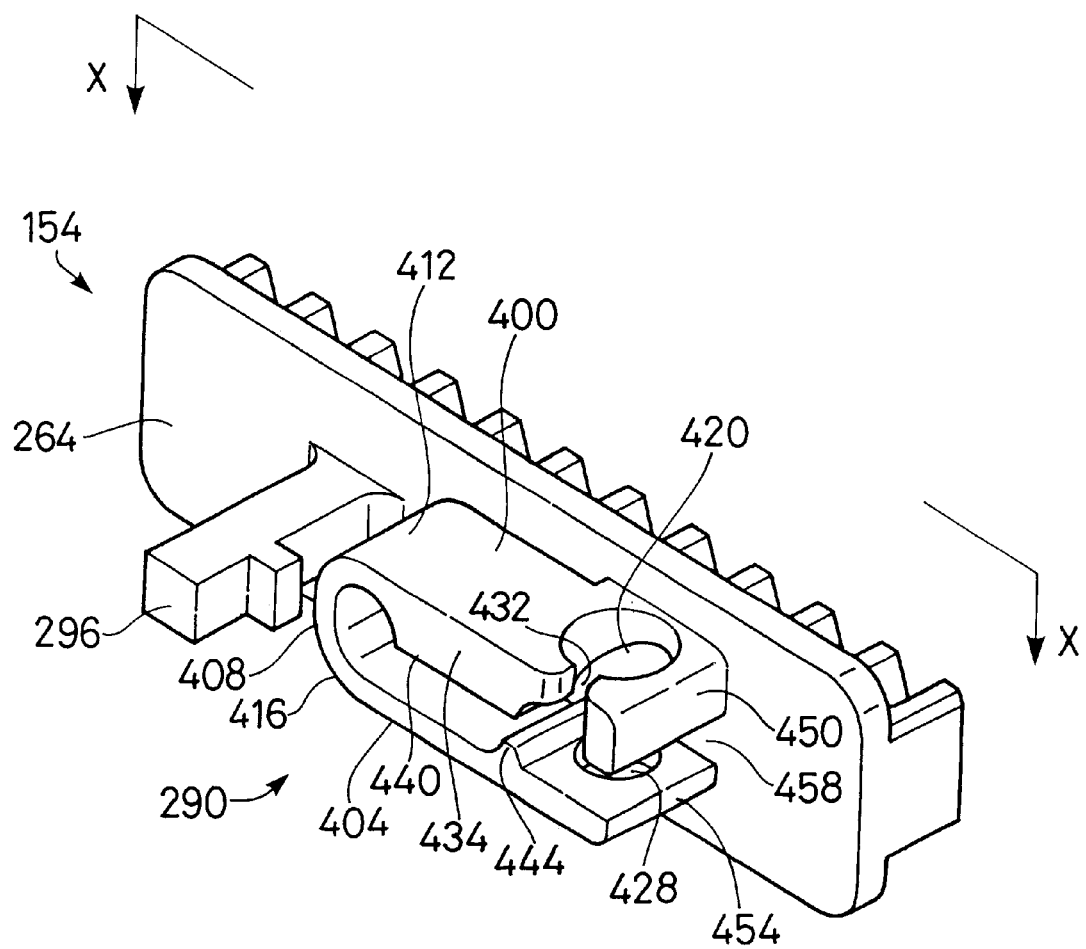
FIG. 9 is an oblique view of the gearing member shown in FIGS. 6(A–C) illustrating the detailed structure of a cable terminating structure.
Figure 10:
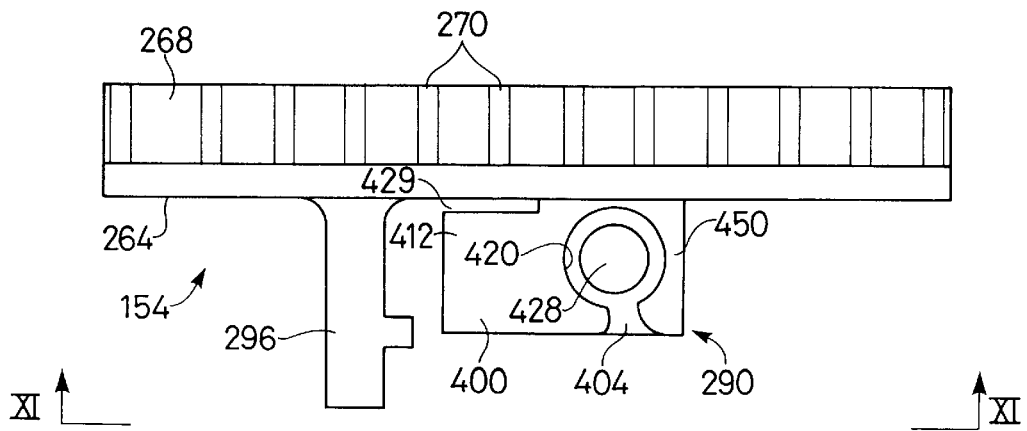
FIG. 10 is a view taken along line X—X in FIG. 9.
Figure 11:
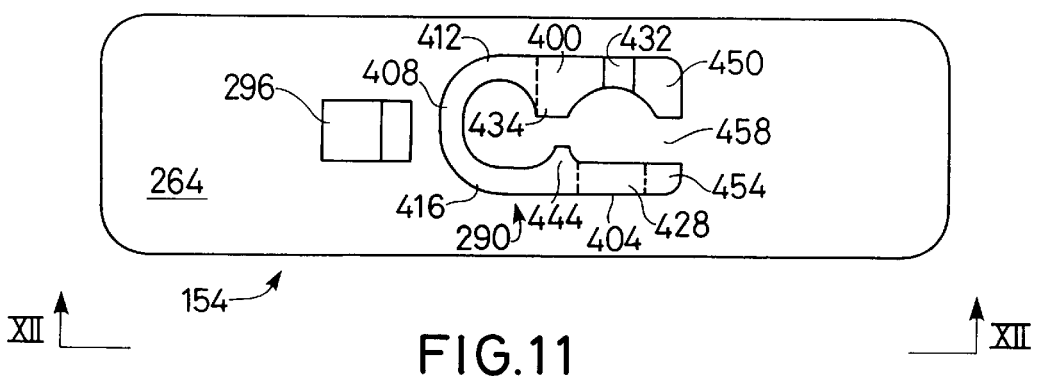
FIG. 11 is a view taken along line XI—XI in FIG. 10.
Figure 12:
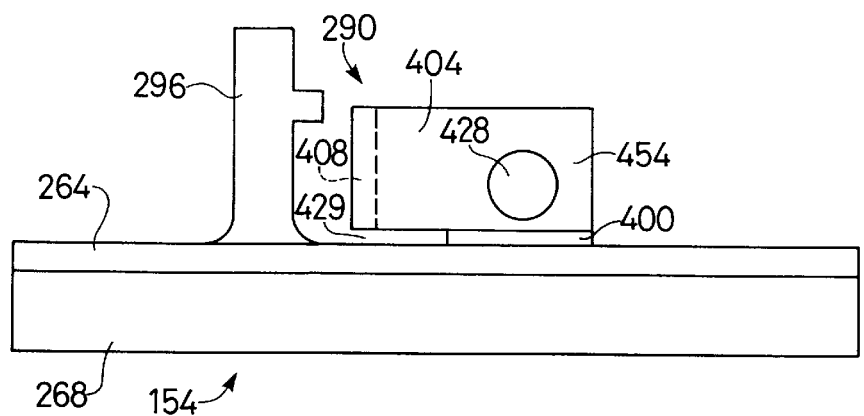
FIG. 12 is a view taken along line XII—XII in FIG. 11.

FIG. 9 is an oblique view of gearing member 154 showing the detailed structure of cable terminating projection 290 that extends generally perpendicularly from bottom surface 264. FIG. 10 is a view taken along line X—X in FIG. 9; FIG. 11 is a view taken along line XI—XI in FIG. 10, and FIG. 12 is a view taken along line XII—XII in FIG. 11. Cable terminating projection 190 of camming member 150 is constructed the same way. More specifically, cable terminating projection 290 includes a first wall 400, a second wall 404 spaced apart from first wall 400, and a bridging wall 408 extending across a rear end 412 of first wall 400 and a rear end 416 of second wall 404.

First wall 400 includes a first detenting structure in the form of a first detenting opening 420 extending entirely through first wall 400 for receiving the spherically-shaped cable end protuberance 292 attached to inner wire 97. Similarly, second wall 404 includes a second detenting structure in the form of a second detenting opening 428 extending entirely through second wall 404 for receiving the spherically-shaped cable end protuberance 292. At least one of first wall 400 and second wall 404 includes a resilient portion for deflecting in response to a pulling force applied to the cable terminating protection 290 by the cable end protuberance 292 so as to release the cable end protuberance, 292 from cable terminating projection 290. The resilient portion can comprise the material forming cable terminating projection 290, such as an elastic resin or a plate spring, or by the structure of first wall 400 and/or second wall 404. In this embodiment, as shown more clearly in FIGS. 10 and 12, first wall 400 is affixed to bottom surface 264 only along part of its entire length. Rear end 412 of first wall 400, bridging wall 408, and second wall 404 are not connected to bottom surface 264. Instead, there is a space 429 between these structures and bottom surface 264. As a result, second wall 404 functions as a deflectable plate spring in a manner described below. Of course, in other embodiments the space 429 can be omitted, and the resiliency may be obtained in many other ways In this embodiment, the diameter of first detenting opening 420 is greater than the diameter of second detenting opening 428 as well as the diameter of cable end protuberance 292. Also, first wall 400 includes a slot 432 extending from first detenting opening 420 through a side edge 434 of the first wall 400. These structures facilitate assembly with the inner wire 97 in a manner discussed below. Front end 450 of first wall 400 and a front end 454 of second wall 404 define a space 458 therebetween for receiving inner wire 97 therethrough in a manner shown in FIG. 14. To add some strength to cable terminating projection 290, first wall 400 includes a reinforcing rib 440, and second wall 404 includes a reinforcing rib 444. Reinforcing ribs 440 and 444 also help maintain the position of cable end protuberance 292 at first detenting opening 420 and second detenting opening 428.

Figure 13:
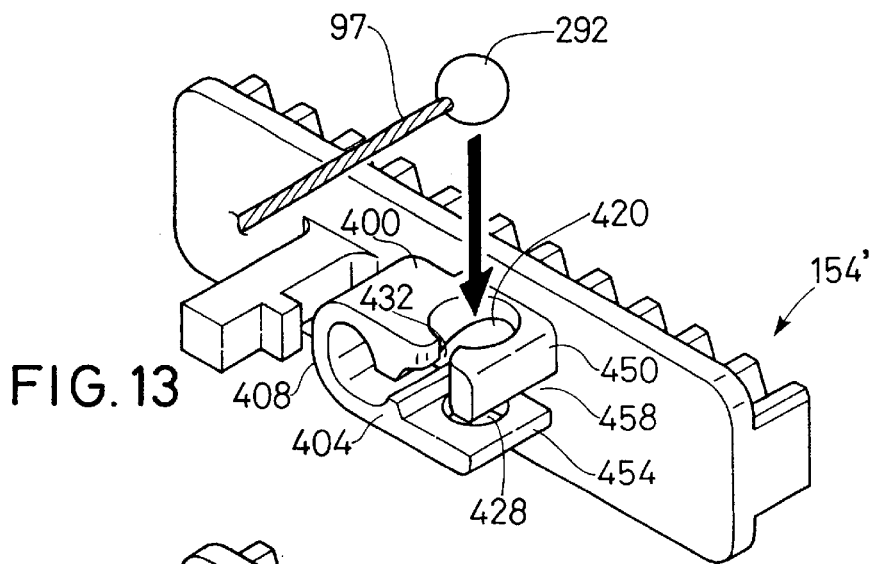
FIGS. 13–15 are oblique views showing the assembly and detenting operation of the gearing member shown in FIG. 9.
Figure 14:
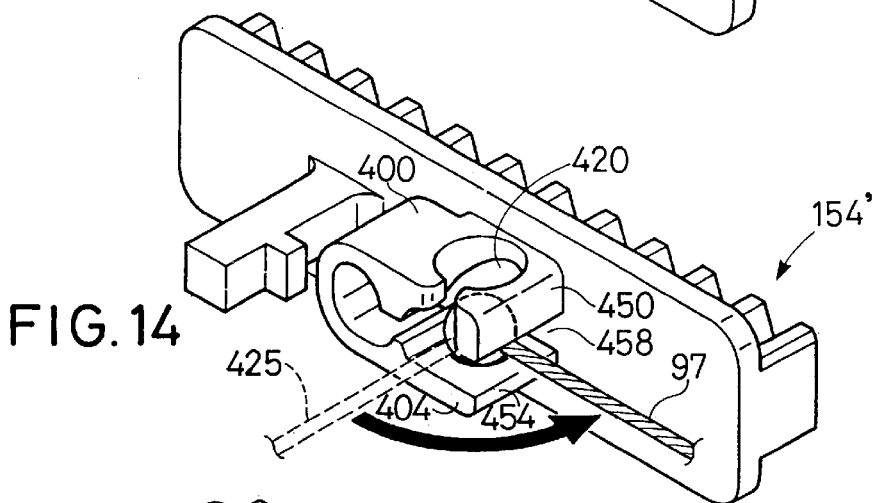
Figure 15:
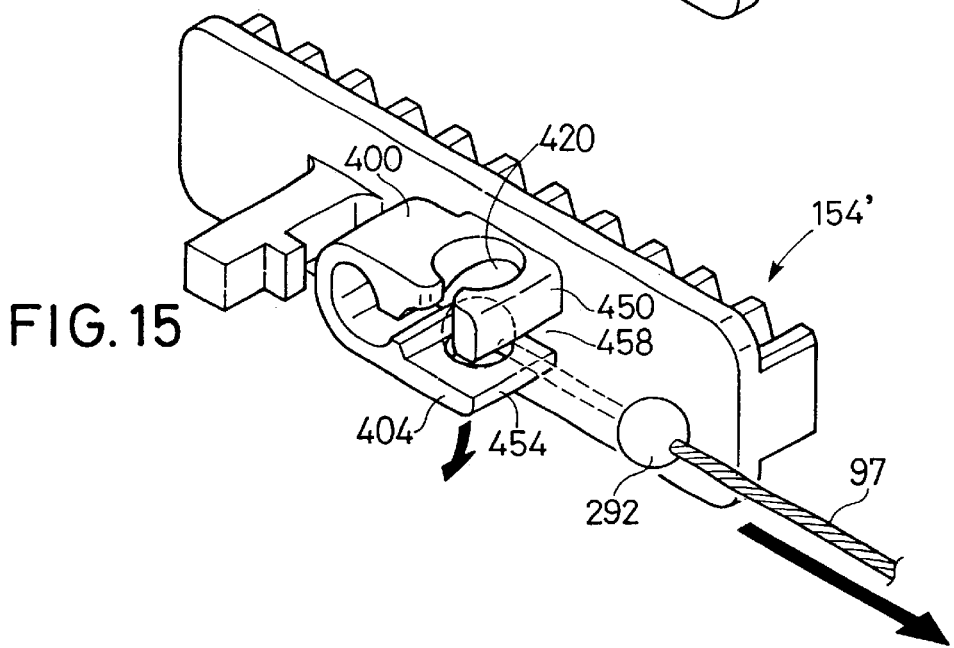

FIGS. 13–15 are oblique views showing the assembly and detenting operation of the gearing member 154 shown in FIG. 9. Initially, as shown in FIG. 13, cable end protuberance 292 and inner wire 97 are passed through first detenting opening 420 and slot 432, respectively, until cable end protuberance 292 is supported in second detenting opening 428. Thereafter, as shown in FIG. 14, inner wire 97 is rotated counterclockwise approximately 90° so that inner wire 97 is sandwiched in space 458 between front end 450 and front end 454. At this time cable end protuberance 292 may be resting in both first detenting opening 420 and second detenting opening 428, but that is not necessary. For example, it is also possible for cable end protuberance 292 to rest in second detenting opening 428 alone, with forward movement of cable end protuberance 292 being inhibited by front ends 450 and 454. When an excessive pulling force is applied to inner wire 97, the resiliency of second wall 404, which functions as a plate spring in this embodiment, causes second wall 404 to deflect downward as shown by the arrow in FIG. 15 as a result of the forward force exerted by cable end protuberance 292 As a result, cable end protuberance 292 is allowed to exit cable terminating projection 290 without damaging cable terminating projection 290.

Figure 16:
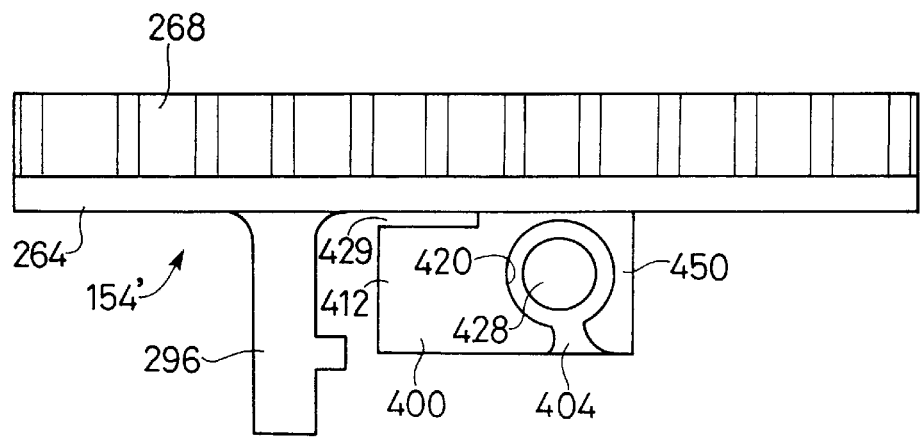
FIGS. 16–18 are views corresponding to FIGS. 10–12, respectively, of another embodiment of a gearing member according to the present invention.
Figure 17:
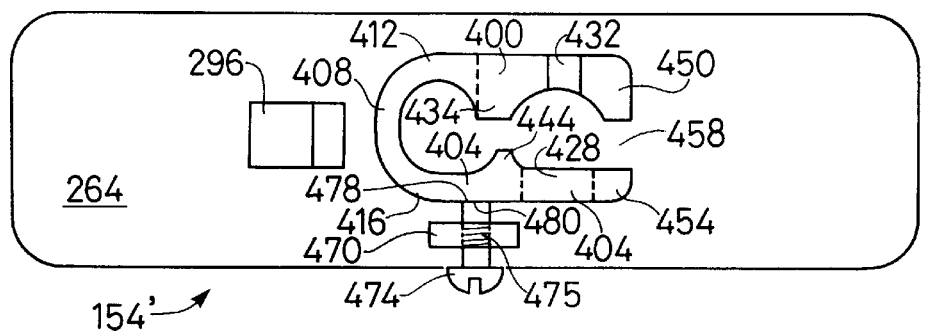
Figure 18:
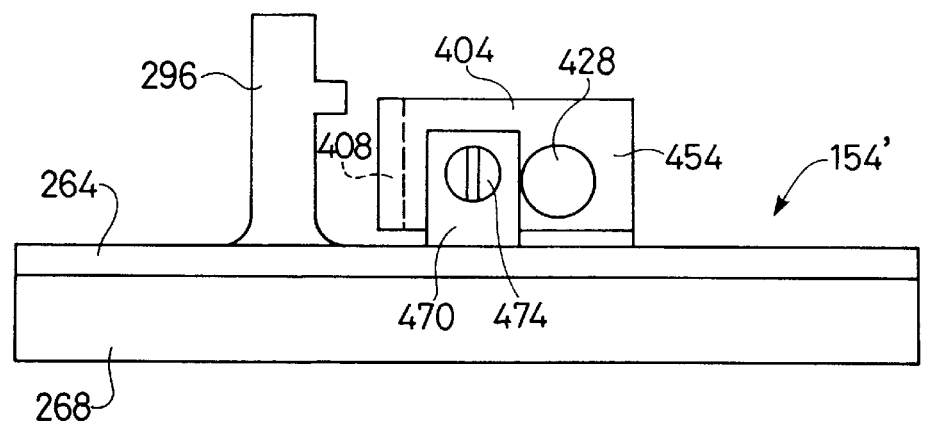

FIGS. 16–18 are views corresponding to FIGS. 10–12, respectively, of another embodiment of a gearing member 154' according to the present invention, wherein identical components are numbered the same as in FIGS. 10–12. In this embodiment, a deflection adjusting wall 470 extends generally perpendicularly from bottom surface 264 for supporting a threaded deflection adjusting screw 474 in a threaded opening 475. An end 478 of adjusting screw contacts a side 480 of second wall 404. The force required to deflect second wall 404 may be adjusted by adjusting the position of deflection adjusting screw 474.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). For instance, the number of horizontal surfaces on camming member 150 may be varied as desired. Camming member 150 and gearing member 154 need not move in straight lines, and the orientation of gearing teeth 270 need not be in a straight line.

Although the detenting structures in cable terminating projection 290 were shown as openings extending completely through first wall 400 and second wall 404, the detenting structure(s) may be formed as a dimple on first wall 400 and/or second wall 404. Detenting opening 420 need not be larger than detenting opening 428. Slot 432 may be omitted, whereupon and cable end protuberance 292 may be placed in the detenting structure(s) by manually spreading first wall 400 and second wall 404. Cable end protuberance 292 need not be spherical and may be any structure and shape that allows spreading of first wall 400 and second wall 404 without binding.

Finally, as noted earlier, the present invention is not limited to a bicycle indicating device, and it has application in any device wherein a member is provided for receiving a pulling force of a control cable. Thus, the scope of the invention should not be limited by the specific structures disclosed or the apparent initial focus on a particular structure or feature.

What is claimed is:

1. A gear indicating apparatus for coupling to a control cable having a cable end protuberance attached thereto comprising:
   a movable gear indicator:
   a member for moving the movable gear indicator and having a cable terminating structure, wherein the cable terminating structure includes:
      a first wall defining a first detenting structure for receiving the cable end protuberance;
      a second wall spaced apart from the first wall; and
      wherein at least one of the first wall and the second wall includes a resilient portion for deflecting in response to a pulling force applied to the cable terminating structure by the cable end protuberance so as to release the cable end protuberance from the first detenting structure.

2. The apparatus according to claim 1 wherein the cable terminating structure comprises a cable terminating projection that extends from a surface of the member.

3. The apparatus according to claim 1 wherein the cable terminating structure includes a bridging wall bridging the first wall and the second wall.

4. The apparatus according to claim 3 wherein the bridging wall extends across a rear end of the first wall and a rear end of the second wall.

5. The apparatus according to claim 4 wherein a front end of the first wall and a front end of the second wall define a space therebetween for receiving the control cable therethrough.

6. The apparatus according to claim 1 wherein the first wall includes a first detenting recess for forming the first detenting structure.

7. The apparatus according to claim 6 wherein the first wall includes a first detenting opening extending entirely through the first wall for forming the first detenting recess.

8. The apparatus according to claim 7 wherein the first wall includes a slot extending from the first detenting opening through a side edge of the first wall.

9. The apparatus according to claim 8 wherein the cable terminating structure includes a bridging wall bridging the first wall and the second wall.

10. The apparatus according to claim 9 wherein the bridging wall extends across a rear end of the first wall and a rear end of the second wall.

11. The apparatus according to claim 10 wherein a front end of the first wall and a front end of the second wall define a space therebetween for receiving the control cable therethrough.

12. The apparatus according to claim 6 wherein the second wall includes a second detenting recess for forming a second detenting structure.

13. The apparatus according to claim 12 wherein the first wall includes a first detenting opening extending entirely through the first wall for forming the first detenting recess, and wherein the second wall includes a second detenting opening extending entirely through the second wall for forming the second detenting recess.

14. The apparatus according to claim 13 wherein the first wall includes a slot extending from the first detenting opening through a side edge of the first wall.

15. The apparatus according to claim 14 wherein the cable terminating structure includes a bridging wall bridging the first wall and the second wall.

16. The apparatus according to claim 15 wherein the bridging wall extends across a rear end of the first wall and a rear end of the second wall.

17. The apparatus according to claim 16 wherein a front end of the first wall and a front end of the second wall define a space therebetween for receiving the control cable therethrough.

18. The apparatus according to claim 1 wherein at least one of the first wall and the second wall extends from a surface of the member, and wherein at least one of the first wall and the second wall defines a space between the surface of the member and the at least one of the first wall and the second wall.

19. The apparatus according to claim 18 wherein the first wall extends from the surface of the member, wherein the second wall is coupled to the first wall through a bridging wall, and wherein the entire second wall forms a space between the surface of the member and the second wall.

20. The apparatus according to claim 1 further comprising a deflection adjusting mechanism for adjusting an amount of force required to deflect the resilient portion.

21. The apparatus according to claim 20 wherein the deflection adjusting mechanism comprises a screw having an end that contacts the resilient portion.

22. The apparatus according to claim 21 wherein the deflection adjusting mechanism further comprises a deflection adjusting wall extending from a surface of the member, and wherein the screw extends through the deflection adjusting wall.

23. A gear indicating apparatus comprising:
a gear indicator:
a control cable having a cable end protuberance attached thereto; and
a cable coupling member for moving the gear indicator and having a cable terminating structure through which a pulling force of the cable end protuberance passes, wherein the cable terminating structure includes:
a first wall defining a first detenting structure for receiving the cable end protuberance;
a second wall spaced apart from the first wall; and
wherein at least one of the first wall and the second wall includes a resilient portion for deflecting in response to a pulling force applied to the cable terminating structure by the cable end protuberance so as to release the cable end protuberance from the first detenting structure.

24. The apparatus according to claim 23 wherein the first wall includes a first detenting recess for forming the first detenting structure, and wherein the cable end protuberance is disposed in the first detenting recess.

25. The apparatus according to claim 24 wherein the cable end protuberance has a spherical shape.

26. The apparatus according to claim 1 wherein at least a portion of one of the first wall and the second wall is formed of a resilient material that deforms in response to a pulling force applied to the cable terminating structure by the cable end protuberance so as to release the cable end protuberance from the first detenting structure.

* * * * *